June 12, 1945.　　H. S. MILLER　　2,378,236
PRODUCTION OF ETHYLENE
Filed May 2, 1944
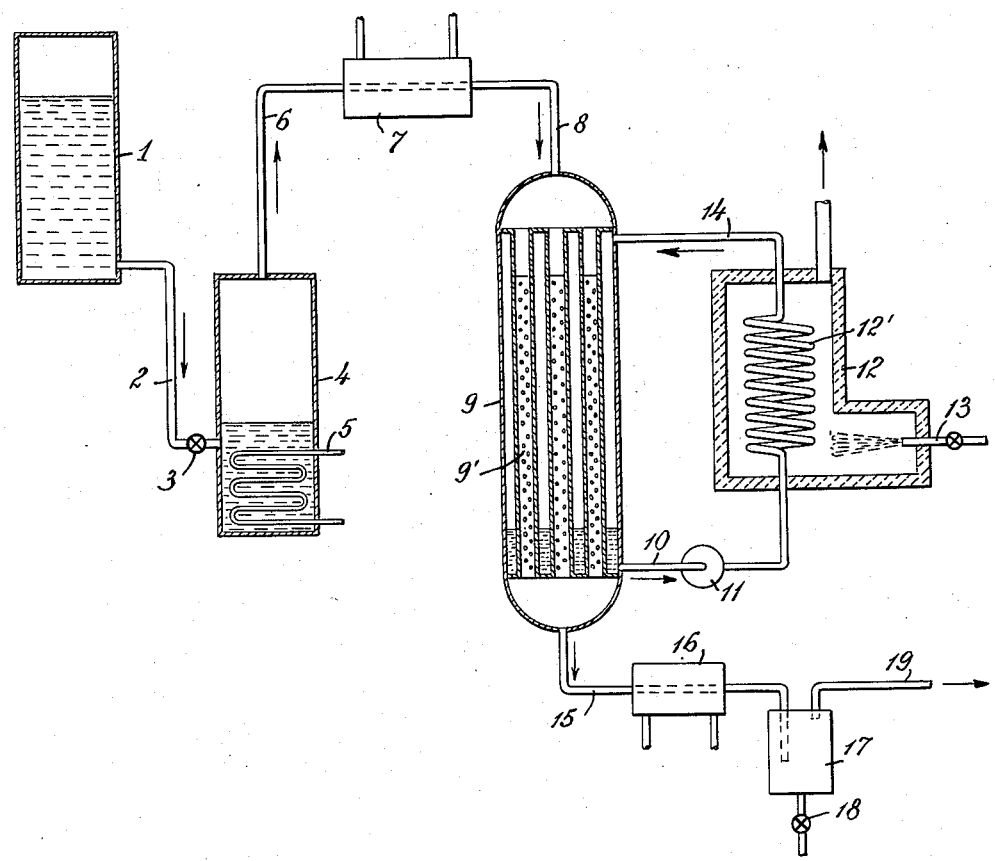
INVENTOR.
Hoke S. Miller
BY
ATTORNEYS Patented June 12, 1945

2,378,236

UNITED STATES PATENT OFFICE 2,378,236

PRODUCTION OF ETHYLENE

Hoke S. Miller, Stamford, Conn., assignor to Air Reduction Company, Incorporated, New York, N. Y., a corporation of New York Application May 2, 1944, Serial No. 533,809

6 Claims. (Cl. 260—682)

This invention relates to the production of ethylene and particularly to an improved method of dehydrating ethyl alcohol and ethyl ether to produce ethylene.

It is known that ethyl alcohol and ethyl ether can be converted to ethylene by dehydration in the presence of a catalyst. The known method depends upon the use of aluminum oxide as the catalyst, the reaction being conducted at a temperature of from 360° to 400° C. While aluminum oxide is capable of effecting the desired reaction, it causes, unfortunately, the simultaneous formation of appreciable quantities of hydrogen, saturated hydrocarbons, unsaturated polymers, carbon monoxide and other undesirable impurities such as aldehydes and acids which contaminate the product. One of the principal uses of ethylene is for anaesthesia, and a mere trace of carbon monoxide in the ethylene renders it unfit for such purposes. Consequently alumina cannot be used satisfactorily in the preparation of ethylene for anaesthesia, and the impurities present in ethylene produced by means of alumina catalysts make it unsuitable for many other purposes.

It is the object of the present invention to afford a more efficient and satisfactory method of dehydrating ethyl alcohol and ethyl ether to produce ethylene which is substantially free from carbon monoxide and other impurities and a catalyst suitable for use in the method and capable of effecting the desired results.

Other objects and advantages of the invention will be apparent as it is better understood by reference to the following specification and the accompanying drawing, in which an apparatus suitable for the practice of the method is diagrammatically illustrated.

I have discovered that a more satisfactory and efficient catalyst for the dehydration of ethyl alcohol and ethyl ether is derived from clays variously termed "bentonite," "montmorillonite," etc., but more properly classified as "smectites." When such clays are treated with hot, dilute acid, usually sulphuric acid of about 25% concentration, certain soluble constituents are removed. The material may be subjected to heat treatment in the presence of acid at temperatures of about 275° F. or even up to 750° F. The excess acid and soluble salts are separated by a suitable water wash. The resulting product is a clay having a greatly increased adsorptive capacity and which has been used heretofore for decolorizing animal and vegetable oils, sugar syrups, fats, waxes and the like.

The methods of treating such clays and the products are well known in the art. The methods are described in the patents to Baylis Nos. 1,776,990, 1,792,625, 1,818,453 and 1,819,496, and in various other patents including the patent to Belden et al., No. 1,980,569. The product has been marketed under the trade names of "Filtrol" and "Super Filtrol."

An aqueous extract obtained by shaking 50 grams of activated clays of the type described with 100 cc. of distilled water at room temperature had a pH determined by means of a glass electrode varying from 3.03 to 6.80. The composition and the pH may vary considerably. While I do not wish to be restricted to any theory, I believe that the value of such activated clays for the purpose of the present invention depends upon their physical conformation rather than the chemical composition.

As catalysts, the activated clays may be used in the form of irregular pieces of suitable size or they may be formed into suitable shapes by extrusion, pelleting and the like. I have found that short rods or pellets about one-eighth inch in diameter and one-quarter inch long give excellent results in vapor phase dehydration. The activated clays, whether pelleted or not, have good mechanical strength and are well adapted for use in the usual types of catalytic reactors.

In carrying out the invention, I may employ any suitable apparatus, for example the apparatus illustrated in the drawing, in which a supply of alcohol or ether to be dehydrated is maintained in the storage tank 1. The alcohol or ether is withdrawn through a pipe 2 and is admitted through a valve 3 into a boiler 4 which is supplied with heat by means of a coil 5. Steam or any other suitable heating medium may be maintained in the coil. The alcohol or ether is vaporized and passes through a pipe 6 and superheater 7 where additional heat is supplied by means of steam or any other suitable heating agent and thence through a pipe 8 to the reaction chamber 9. The catalyst as previously described is disposed in tubes 9' within the reaction chamber 9. The tubes are surrounded by vapors of a suitable heating medium, preferably a high boiling heat transfer material such as diphenyl or diphenyl oxide. The temperature of the catalyst can be maintained at the desired point by such vapors. The temperature of the heat transfer material is maintained at the lowest temperature which will give substantially complete conversion of the alcohol or ether. The condensed vapors of the heat transfer material are withdrawn from the reaction chamber 9 through a pipe 10 and pump 11 and are circulated by means of the pump through a heating coil 12' within a furnace 12. The material within the heating coil is heated to the desired temperature by hot gases supplied in any suitable manner, for example by an oil burner 13. The vapors from the heating coil pass through a pipe 14 to the reaction chamber.

As the alcohol or ether vapors pass through the catalyst within the tubes 9', they are converted to ethylene which, together with the steam or water vapor resulting from the dehydration, escapes through a pipe 15 to a cooler 16 where the greater portion of the water vapor is condensed. The liquid water is separated from the gas in a separator 17 and is withdrawn through a valve 18. The condensate will contain, in addition to the water formed by the reaction, any alcohol or ether which passes through the catalyst unconverted. The ethylene passes through the pipe 19 to a gas holder (not shown) in which it may be stored before being utilized or compressed into cylinders for transportation.

Although catalysts of the type described have a remarkably long life in continuous operation, they do eventually, as would be anticipated, lose some of their original activity due to the deposition of carbon or tar upon the highly active surfaces. Under this condition, the tendency to suppress side reactions diminishes.

I have discovered that the passage of a mixture of steam with air or oxygen over the heated catalyst removes the carbon or tar to such an extent that the original activity of the catalyst is fully restored. Thus, when the catalyst has become less active after prolonged use, it is quickly returned to its initial active condition by passing a mixture of steam with air or oxygen through the catalyst without removing it from the tubes, the desired temperature being maintained by continuing the circulation of the vapors of diphenyl or diphenyl oxide as in the practice of the dehydration method. Such restoration by so simple a procedure is an important factor in the successful commercial operation of the method, since the useful life of the catalyst may be prolonged indefinitely.

The temperature at which the operation may be conducted varies over a wide range. While the temperatures specified in the following examples are those selected to give the best results, temperatures between 275° and 375° C. may be employed, and the method is operative over an even broader range of 250° to 400° C.

As an example of the invention, 500 cc. of one-eighth by one-quarter inch Filtrol pellets were placed in a "Dowtherm" (a mixture of diphenyl and diphenyl oxide) heated chrome steel reactor approximately one inch in diameter and four feet in length. Suitable connections were provided for feeding ethyl alcohol vapors into the reactor and removing effluent vapors through a water-cooled condenser into a receiver for the condensate and a meter for measuring the ethylene produced. At a temperature of 280° C., and a feed of 80 cc. of 95% ethyl alcohol per hour, there was produced one cubic foot of ethylene per hour having a purity of 99.4% and free from carbon monoxide. After more than two weeks of operation, the reaction temperature had been increased to only 300° C. Ethylene of the same purity was being produced, and the condensate contained only 5% of unchanged alcohol.

As a further example, after operating for thirty-one days in the manner hereinbefore described, the reaction temperature had been increased to 330° C. to offset the decrease in activity due to carbonization of the catalyst. The run was stopped and the catalyst was burned off at 380–400° C. by means of a mixture of equal volumes of air and steam. After a 44-hour burning period, the production of ethylene was resumed at 300° C. At the end of sixteen days of further operation, the temperature had been raised to only 320° C., and the performance of the catalyst was substantially the same as it was at the analogous period prior to the burning off of carbon.

To determine the effect of various temperatures, 500 cc. of Super Filtrol pellets were placed in the reactor of the apparatus and 80 cc. per hour of 95% by volume ethyl alcohol were fed into the reactor. Tests at various temperatures were made. The amount of alcohol in the condensate is an indication of the completeness of conversion to ethylene of the input alcohol. The results follow:

| Temp., °C. | Duration of test, hours | $C_2H_4$ produced, c. f. h. | $C_2H_4$ per cent purity | Alcohol in condensate, per cent by volume |
|---|---|---|---|---|
| 300–305 | 22 | 1.06 | 99.4 | 0.0 |
| 300 | 18 | 1.10 | 99.4 | 0.0 |
| 295–300 | 20 | 1.11 | 99.4 | 0.0 |
| 290 | 27 | 1.06 | 99.4 | 0.0 |
| 280 | 20 | 1.05 | 99.4 | 0.6 |
| 278–280 | 5 | 1.00 | 99.4 | 1.8 |

For the purpose of comparison, a further run was made in the same apparatus with a similar alcohol feed, but an acid-washed activated alumina was substituted as a catalyst.

| Temp. of reactor, °C. | $C_2H_4$ produced, c. f. h. | $C_2H_4$, purity percent | Alcohol in condensate, percent by vol. |
|---|---|---|---|
| 275 | 0.0 | | 95 |
| 295 | 0.02 | 85 | 95 |
| 330 | 0.33 | 99.2 | 77 |
| 350 | 0.62 | 98.9 | 62 |
| 360 | 0.83 | 98.6 | 53 |
| 370 | 0.94 | 98.2 | 41 |
| 380 | 1.03 | 98.2 | 28 |
| 390 | 1.1 | 98.2 | 12 |

As is evident from the foregoing examples, the activated clay catalyst as described herein not only operates at a temperature about 100° C. lower than does acid-washed alumina, but gives ethylene of much greater purity and is capable of producing ten times as much ethylene from a given volume of catalyst.

Using the same apparatus as that described in the first example, 48.9 grams per hour of ethyl ether were introduced into the reactor which contained 500 cc. of one-eighth by one-quarter inch Filtrol pellets. At a temperature of 290° C., there was produced 1.06 cubic feet per hour of gas containing 98.4% of ethylene and 1.0% of butylene plus higher boiling materials. The yield of ethylene was 98.4%.

A similar operation, in which acid-washed activated alumina was used as the catalyst, through which 51.4 grams of ethyl ether per hour were passed at a temperature of 390° C., there was produced 1.12 cubic feet of gas per hour containing 94.6% ethylene and 3.3% butylene plus higher boiling materials. The yield of ethylene was approximately 93%. As in the case of ethyl alcohol, the use of activated clay as a catalyst permitted operation at a temperature 100° C. lower with a superior yield.

Although in the preceding examples I have indicated the use of either ethyl alcohol or ethyl ether as the material which is converted to ethylene by the procedure described, mixtures of ethyl alcohol and ethyl ether in any proportions may be utilized in the same way. These ethyl compounds are readily miscible and mixtures in the presence of the activated clay catalyst are dehydrated to produce the desired product.

The method as described, employing activated clay catalysts, is much more efficient and because of the lower temperature possible there is less danger of side reactions and the production of contaminating materials in the product. The ethylene produced is of remarkably high purity and particularly free from carbon monoxide. The product meets all requirements of anaesthesia grade ethylene.

Various changes may be made in the details of procedure and in the method of operation and apparatus used without departing from the invention or sacrificing any of the advantages thereof.

I claim:

1. The method of producing ethylene, which comprises dehydrating a compound selected from the group consisting of ethyl alcohol and ethyl ether by passing the vapors of such compound at a temperature ranging from 275–375° C. over a heated catalyst consisting of an acid-activated clay.

2. The method of producing ethylene, which comprises dehydrating a compound selected from the group consisting of ethyl alcohol and ethyl ether by passing the vapors of such compound at a temperature ranging from 250–400° C. over a heated catalyst consisting of acid-activated clay.

3. The method of producing ethylene, which comprises dehydrating a compound selected from the group consisting of ethyl alcohol and ethyl ether by passing the vapors of such compound at a temperature ranging from 275–375° C. over a heated catalyst consisting of a clay activated by treating with acid and washing to remove excess acid and soluble salts.

4. The method of producing ethylene, which comprises dehydrating a compound selected from the group consisting of ethyl alcohol and ethyl ether by passing the vapors of such compound at a temperature ranging from 250–400° C. over a heated catalyst consisting of a clay activated by treating with acid and washing to remove excess acid and soluble salts.

5. The method of producing ethylene, which comprises dehydrating a mixture of ethyl alcohol and ethyl ether by passing the vapors of such mixture at a temperature ranging from 275–375° C. over a heated catalyst consisting of an acid-activated clay.

6. The method of producing ethylene, which comprises dehydrating a mixture of ethyl alcohol and ethyl ether by passing the vapors of such mixture at a temperature ranging from 250–400° C. over a heated catalyst consisting of an acid-activated clay.

HOKE S. MILLER.